United States Patent [19]

Lowenhaupt et al.

[11] Patent Number: 4,548,794
[45]* Date of Patent: * Oct. 22, 1985

[54] METHOD OF RECOVERING NICKEL FROM LATERITE ORES

[75] Inventors: E. Harris Lowenhaupt, Gasquet, Calif.; John E. Litz, Lakewood; Dennis L. Howe, Broomfield, both of Colo.

[73] Assignee: California Nickel Corporation, Crescent City, Calif.

[*] Notice: The portion of the term of this patent subsequent to Sep. 17, 2002 has been disclaimed.

[21] Appl. No.: 516,236

[22] Filed: Jul. 22, 1983

[51] Int. Cl.⁴ .................. C01G 53/00; C01G 55/00; C22B 3/00

[52] U.S. Cl. ........................... 423/123; 423/128; 423/131; 423/146; 423/141; 423/150; 423/159; 423/161; 423/166; 75/101 R; 75/108; 75/115; 75/119; 75/121

[58] Field of Search ............... 423/123, 140, 141, 146, 423/150, 155, 530, 128, 131, 159, 161, 166; 75/101 R, 108, 115, 119, 121

[56] References Cited

U.S. PATENT DOCUMENTS

| | | | |
|---|---|---|---|
| 2,842,427 | 7/1958 | Reynaud et al. | 23/183 |
| 2,872,306 | 2/1959 | Morrow | 75/101 |
| 2,971,836 | 2/1961 | Hall | 75/119 |
| 3,082,080 | 3/1963 | Simons | 75/115 |
| 3,086,846 | 3/1958 | Clark | 423/530 |
| 3,093,559 | 6/1963 | White | 204/123 |
| 3,293,027 | 12/1966 | Mackiw et al. | 75/119 |
| 3,333,924 | 8/1967 | Hazen et al. | 23/165 |
| 3,365,341 | 1/1968 | Fitzhugh, Jr. et al. | 75/119 |
| 3,466,144 | 9/1969 | Kay | 23/183 |
| 3,473,920 | 10/1969 | Fitzhugh, Jr. et al. | 75/109 |
| 3,720,749 | 3/1973 | Taylor et al. | 423/141 |
| 3,737,307 | 6/1973 | Fitzhugh, Jr. et al. | 75/109 |
| 3,761,566 | 9/1970 | Michal | 423/141 |
| 3,773,891 | 11/1973 | O'Neill | 423/139 |
| 3,793,430 | 2/1974 | Weston | 423/36 |
| 3,793,432 | 2/1974 | Weston | 423/143 |
| 3,804,613 | 4/1974 | Zundel et al. | 75/101 R |
| 3,809,549 | 5/1974 | Opratko | 75/101 R |
| 3,991,159 | 11/1976 | Queneau et al. | 423/150 |
| 4,012,484 | 3/1977 | Lussiez | 423/53 |
| 4,044,096 | 8/1977 | Queneau et al. | 423/150 |
| 4,065,542 | 12/1977 | Subramanian et al. | 423/35 |
| 4,097,575 | 6/1978 | Chou et al. | 423/150 |
| 4,098,870 | 7/1978 | Fekete et al. | 423/123 |
| 4,195,065 | 3/1980 | Duyvesteyn | 423/150 |
| 4,410,498 | 10/1983 | Hatch et al. | 423/150 |
| 4,415,542 | 11/1983 | Queneau et al. | 423/150 |

Primary Examiner—John Doll
Assistant Examiner—Robert L. Stoll
Attorney, Agent, or Firm—Sheridan, Ross & McIntosh

[57] ABSTRACT

According to the present invention, processes are provided for recovery of nickel, cobalt and like metal values from laterite ores wherein the ores are separated into high and low magnesium containing fractions, the low magnesium fraction is leached with sulfuric acid at elevated temperatures and pressure to solubilize the metal values. The pregnant liquor resulting from the high pressure which also contains solubilized Fe, Al and acid is then contacted with a low magnesium fraction of the ore in a low pressure leach under conditions such that at least some of the acid is neutralized and substantially all of the solubilized Fe and Al is removed as hematite and alunite precipitate.

In one embodiment, the pregnant liquor from the high pressure leach and the high magnesium fraction are contacted at atmospheric pressure and a temperature of about 80° C. prior to low pressure leaching. In other embodiments, various process streams are separated by size and otherwise, and recycled to within the processes.

In another embodiment, all leached values, including magnesium and sulfuric acid, are recovered, resulting in a dischargeless process which is environmentally and economically acceptable. Elimination of prior art iron and aluminum contaminants by the low pressure leach provides a simplified method of recovery of all elements in the leachate.

21 Claims, 2 Drawing Figures

METHOD OF RECOVERING NICKEL FROM LATERITE ORES

FIELD OF INVENTION

This invention relates to the recovery of nickel and cobalt from lateritic ores and, in particular, to a method of sequentially leaching ore fractions to effectively solubilize the nickel and cobalt while adjusting the iron, aluminum and other trivalent ions to acceptably low levels.

BRIEF DESCRIPTION OF THE PRIOR ART

A wide variety of processes are known for the recovery of nickel and/or cobalt from various nickel-bearing ores including laterite and serpentine ores. Basic to one such process is the solubilizing of the nickel and/or cobalt by sulfuric acid leaching followed by neutralization.

While the sulfuric acid leach process obtains a high extraction of nickel and cobalt, in the prior art it has been environmentally unsound due to coextraction of iron, aluminum, and the like, and has often been uneconomical when ores contain large amounts of magnesium which consumes excessive sulfuric acid.

Because in prior art practice iron and aluminum are present in relatively large quantities, i.e. several grams per liter of each, removal by precipitation as hydroxides or basic sulfates is not easily accomplished as will be recognized by those familiar with the gelatinous nature of such precipitates. If iron, aluminum, and other trivalent ions are present in the leachate, they will cause severe damage to aquatic systems if the spent leachate is discarded to natural waters such as an ocean.

Alternatively, if the impure leachate is to be processed further, e.g. for recovery of magnesium values, the presence of large amounts of trivalent ions creates substantial process difficulties and costs due to the gelatinous character of these precipitates.

Prior art practices did not efficiently reject iron and aluminum impurities, and were not always economical when high magnesium dissolution was encountered.

U.S. Pat. No. 3,991,159 is representative of prior art processes wherein sulfuric acid leaching is carried out at elevated temperatures, e.g. 200°-300° C., and elevated pressures, e.g. 225 psig to 1750 psig. Other examples of high pressure acid leaches are disclosed in U.S. Pat. Nos. 4,195,065; 3,804,613; and 4,044,096.

It is known to minimize consumption of both $H_2SO_4$ and/or the neutralizing agent, e.g. MgO, by separating the nickel bearing ore into high and low magnesium fractions. By treating only the low magnesium fraction acid consumption can be reduced. By using the high magnesium fraction or raw ore itself as some or all of the neutralizing agent, use of sulfuric acid is minimized. U.S. Pat. No. 3,991,159 teaches the use of high magnesium serpentine ore to neutralize acid leach slurries of limonite ore. U.S. Pat. No. 4,097,575 teaches separating high magnesium ore into high and low nickel fractions by screening and converting the low nickel fraction to a neutralizer by roasting it under oxidizing conditions. U.S. Pat. No. 3,804,613 teaches preconditioning high magnesium ore by preleaching it with spent $H_2SO_4$ leach liquor prior to the standard high pressure $H_2SO_4$ leach. U.S. Pat. No. 4,044,096 is specifically directed to scalping laterite ore, i.e. removing the coarse, magnesium-rich fraction to effect savings in acid consumption and for use in neutralizing the high pressure $H_2SO_4$ leach liquor. The scalping is effected by physical means, i.e. screening and classifying including the use of screw and rake type classifers.

Prior art processes heretofore have separated the iron and aluminum present in ores such as laterite by precipitating them out of the nickel and cobalt containing pregnant liquor during neutralization. Upon the addition of MgO, $Mg(OH)_2$ or other alkaline neutralizing agent, at the conditions of the prior art processes, aluminum and iron values precipitate out primarily as hydroxides and basic sulfates. Such compounds are gelatinous in nature and upon separation from the nickel and cobalt containing liquors were merely discarded. For example, U.S. Pat. No. 3,991,159 teaches the desirability of effecting rejection of acid, Al and Fe by neutralization but has no teaching regarding the Fe and Al save that they are discarded. U.S. Pat. No. 3,804,613 similarly teaches the advantages of process conditions which maximize the hydrolyzing of Al and Fe and thereby precipitate each out of solution in hydroxide form.

The prior art generally teaches that at high pressure leaching the formation of gelatinous hydrolyzed iron oxides is minimized, i.e. at temperatures above about 260° C., but there is an increase in the amount of solubilized iron sulfates which lead to detrimental scaling.

U.S. Pat. No. 3,809,549 teaches a process directed to the elimination of scale forming iron salts from the nickel containing liquor by the presence of sufficient quantities of pyrite during the initial acid leach. However, hydrolyzed iron oxide is formed with the attendant problems of liquid/solid separation and a method of increasing the settling rate results. U.S. Pat. No. 4,098,870 addresses the same problem, but teaches incremental addition of sulfuric acid as a solution. After neutralization and a difficult solid-liquid separation, the residue containing Al and Fe hydroxides and the like is merely discarded as waste.

It is known that Al and Fe can be removed from the nickel/cobalt containing solutions without the formation of hydroxides and the attendant difficulties of liquid-solid separation if the Al and Fe can be made into insoluble jarosites, alunites and/or other crystalline basic sulfates. U.S. Pat. No. 4,195,065, for example, teaches the addition of water-soluble alkali metal or ammonium salts during the pressure leaching of garnieritic ores to improve liquid/solid separation by reacting the solubilized iron and aluminum with the alkali and/or ammonium cations to form jarosites. Other references disclosing the separation of Al and Fe as jarosites and alunites from Ni/Co containing liquors are U.S. Pat. Nos. 3,466,144 and 4,044,096. Similarly, iron oxides, e.g. $Fe_2O_3$, can be precipitated if formed under conditions which do not result in hydrolysis and formation of hydroxides.

It is an object of the present invention to produce a leachate which is low in iron, aluminum, and similar concentrations, thereby minimizing the need to precipitate appreciable amounts of such metals, while at the same time minimizing the consumption of sulfuric acid and attendant magnesium dissolution and attendant consumption of sulfuric acid.

It is another object of the present invention to provide a process wherein dissolved magnesium values are recovered as magnesium sulfate, which is then calcined to magnesium oxide and sulfur dioxide. The $SO_2$ is recycled to make sulfuric acid for use in leaching. By reducing the amount of magnesium dissolved, the process of this invention provides the added advantage of reducing the capital and operating costs of magnesium sulfate recovery, and of its calcination and conversion of $SO_2$ to acid.

By incorporating the novel practices of the present invention, an acid leach process which is environmentally and economically acceptable is for the first time available. By using the teachings of the present invention, clean leachates, which require only minimal purification, are obtained, and recovery of Ni, Co and Mg is greatly simplifed.

SUMMARY OF THE INVENTION

The present invention provides novel processes for recovering Ni/Co from laterite ore which utilize a low pressure leach, preferably at two different temperatures to preferentially precipitate Al and Fe, as alunite and hematite respectively, while maximizing extraction of the Ni and Co into solution for later recovery.

According to the present invention, processes are provided for recovery of nickel, cobalt and like metal values from laterite ores wherein the ores are separated into high and low magnesium containing fractions. The low magnesium fraction is leached with sulfuric acid at elevated temperature and pressure to solubilize the metal values. The pregnant liquor resulting from the high pressure leach which also contains solubilized Fe, Al and residual acid is then contacted with a high magnesium fraction of the ore in a low pressure leach under conditions such that at least some of the acid is neutralized and substantially all of the solubilized Fe and Al is removed as hematite, jarosite, alunite and/or other basic sulfate precipitate which settles rapidly and is not gelatinous.

In one embodiment, the pregnant liquor from the high pressure leach and the high magnesium fraction are contacted at atmospheric pressure and a temperature of about 80° C. prior to low pressure leaching. In other embodiments, various process streams are separated by size and otherwise, and recycled to within the processes.

DETAILED DESCRIPTION OF THE INVENTION

The present invention provides for improved economical methods of recovering the metal values, i.e. nickel and cobalt, from laterite ores wherein the aluminum and iron from such ores are precipitated as insoluble alunites and hematite thereby improving solid-liquid separation rates and, in addition, the high magnesium fraction of the ore is used for neutralization thereby minimizing the need for independent neutralizing agents while nevertheless permitting metal value recovery from the high magnesium fraction. In general, the methods of the present invention provide for a two-stage process in which the natural characteristics of laterite ore are used to consume the excess acid needed for high percentage dissolution of nickel and cobalt at high temperature and pressure, and the pregnant liquor from the high temperature leach is purified at moderate process pressures and temperatures. The process objectives are accomplished by use of a low pressure, preferably dual temperature, leach subsequent to a primary $H_2SO_4$ leach. Typically, the ore is separated into at least two fractions, one finer and with a lower magnesium content than the other. The low magnesium fraction in combination with recycled residue undergoes high pressure leaching in the presence of excess $H_2SO_4$ to dissolve Ni, Co and Mg. The high pressure leach liquor containing high levels of excess acid, iron and aluminum, is contacted with the high magnesium fraction(s) and undergoes low pressure leaching. In the low pressure leach the magnesium serves to neutralize at least a portion of the acid present and precipitation of the Fe and Al present an insoluble hematite, jarosite and alunite also results.

Residue from the low pressure leach, containing cobalt and nickel may go to the high pressure leach where the metals can be solubilized for recovery. Alternatively, residues from the low pressure leach or leaches may be discarded in part or in total to further reduce the magnesium dissolution and $H_2SO_4$ consumption. The low pressure leach liquor contains relatively little Fe and Al, which may be precipitated without difficulty. The metal values are recoverable from the liquor. In another embodiment (not shown), an overall process is provided wherein the dissolved magnesium values after neutralization are recovered as magnesium sulfate which is calcined to $SO_2$ and MgO. The $SO_2$ is recycled into $H_2SO_4$ for use in the high pressure leach and the MgO is recycled as needed as a neutralizing agent or sold.

Figure 2:
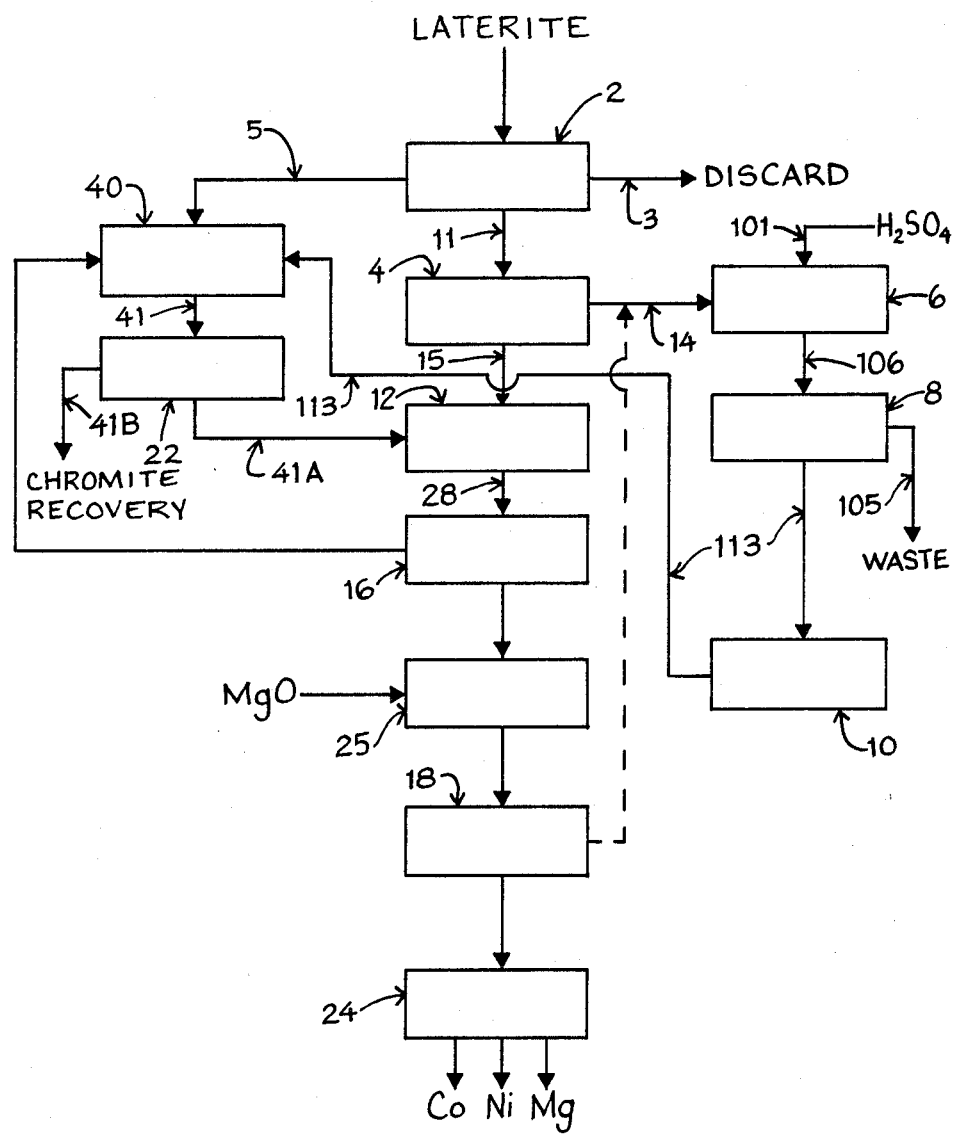
FIG. 2 is a schematic flow diagram of a second embodiment of the present invention.

In one embodiment depicted in FIG. 2 the high pressure leach liquor, a recycle portion of the low pressure leach residue, and a high magnesium fraction of the ore are contacted in an atmospheric leach prior to the low pressure leach.

Figure 1:
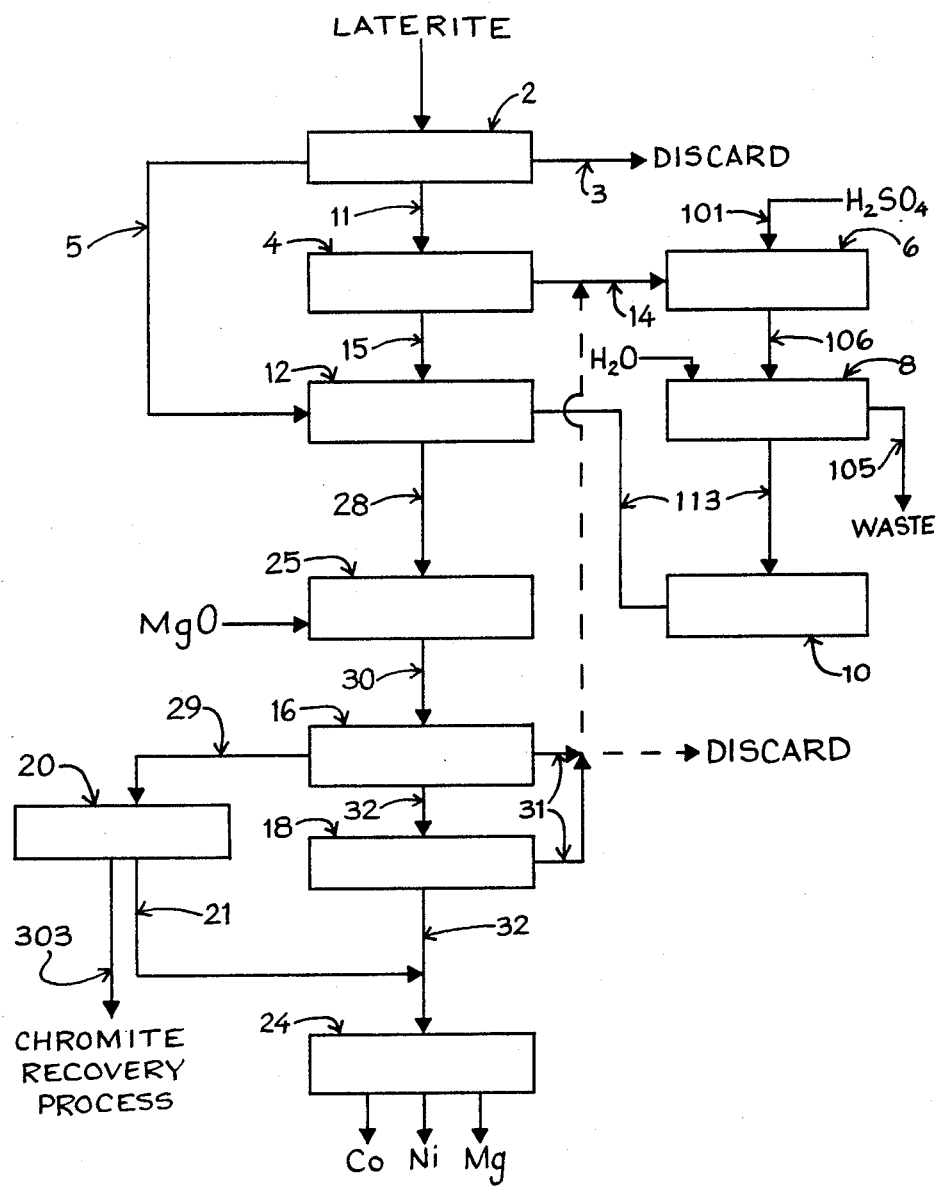
FIG. 1 is a schematic flow diagram of a process according to the present invention.

Referring to FIG. 1, laterite ore is prepared by conventional methods and separated by a classifier 2 into at least two, preferably three fractions. The coarsest of the three fractions 3, i.e. that above about ¼" are typically discarded. Lateritic ores useful in the practice of the present invention are nickel-, cobalt- and magnesium-containing ores in a matrix of natural hydrated oxides of iron and aluminum. Such ores are typically ocher red products of decay having relatively high contents of oxides and hydroxides of iron and aluminum. Laterites are typically composed of some or all of the following major constituents:

Peridotite—An igneous rock high in iron and magnesium minerals, especially olivine;
Saprolite—Partly altered igneous rock, peridotite
Geothite—FeO(OH)
Hematite—$Fe_2O_3$
Magnetite—$Fe_3O_4$
Maghemite—A magnetic ferrous oxide similar to magnetite
Aluminum Oxides—Mixed aluminum oxide materials
Typical laterite ore has an analysis such as the following:

| Element | Approximate Assay Range (%) |
|---|---|
| Nickel | 0.7–0.8 |
| Cobalt | 0.07–0.09 |
| Iron | 28–30 |
| Magnesium | 7–10 |
| Aluminum | 2–3 |
| Manganese | 0.3–0.4 |

-continued

| Element | Approximate Assay Range (%) |
|---|---|
| Chromium | 1.0–1.5 |

The cobalt and nickel tend to concentrate in the relatively soft iron oxide materials, the magnesium in the coarser peridotite and saprolite particles, and the chromite in the relatively hard granular materials of intermediate size range.

Referring again to FIG. 1, the −100 mesh fraction, i.e. the overflow 11 from the classifier 2 which is rich in nickel and cobalt and low in magnesium content is further separated, e.g. by cyclone 4, into a −325 mesh overflow 14 and a +325 mesh underflow 15. The overflow 14 is optionally thickened further and then proceeds to a high pressure sulfuric acid leach 6.

The high pressure leach is in the presence of steam, and sulfuric acid 101 and is typically at conditions known in the art, i.e. at temperatures of from about 200° C. to about 300° C., preferably at about 220° C. to about 270° C., at pressures of from about 200 to about 820 psig and for a time period sufficient to solubilize or leach substantially all of the nickel and cobalt present, typically from about 30 to about 60 minutes or more. In one embodiment improved recovery of Ni and Co is achieved by adding the $H_2SO_4$ 101 to the slurry prior to heating.

The leached slurry 106 comprising a high pressure leach residue and a high pressure leach liquor is separated by countercurrent decantation 8. The liquor 113 is then advantageously concentrated by an evaporator 10, and the underflow or leach residue 105 goes to waste. The high pressure leach (HPL) liquor 113 from the evaporator 10 then advances to the low pressure leach (LPL) 12. The +325 mesh underflow 15 from cyclone 4 and the high magnesium, low nickel- and cobalt-containing fraction, i.e. the +100 mesh underflow 5 from classifier 2, also advance to the low pressure leach 12 where they are contacted with the HPL liquor 113 which is high in acid, Fe and Al.

The low pressure leach 12 of the present invention results in two major advantages. First of all, the magnesium present from the +100 mesh sands 5 and, to a lesser extent, from the +325 underflow 15 serve to neutralize a portion of the acid present in the high pressure leach liquor 113, reducing the acid concentration and thus minimizing or eliminating the amount of neutralizing agent, e.g. MgO, $Mg(OH)_2$, which must be utilized in the downstream neutralization 25. Secondly, the conditions of the low pressure leach (LPL) 12 are such that Al and Fe present are precipitated as insoluble alunites and hematite thereby enhancing the rate of subsequent liquid-solid separations by minimizing formation of gelatinous hydroxides or basic sulfates.

The low pressure leach 12 is typically carried out at moderate to low temperatures and pressures, e.g. from about 140° C. to about 200° C. and from about 90 to about 300 psig. Precipitation of iron oxide, i.e. hematite ($Fe_2O_3$), is preferably carried out at temperatures of from about 140° to about 180° C., most preferably at about 160° C., whereas precipitation of aluminum sulfate product, e.g. alunite, is preferably at temperatures of about 180° to about 200° C. Accordingly, the low pressure leach 12 is performed at two different temperatures, at 140° C. to about 180° C., preferably at about 160° C. for about 1 hour, preferably for about 30 to about 40 minutes and at from about 180° C. to about 200° C. for about 20 to about 30 minutes. Alternatively, the LPL 12 can be at the higher temperature first.

Additional amounts of base, e.g. MgO, $Mg(OH)_2$, or acid-consuming ore needed to complete neutralization of the free acid in the LPL slurry 28 from the HPL liquor 113 may be added during and/or subsequent to the low pressure leach 12. Following neutralization 25 the LPL liquor 30 is again separated from the solids, typically in a cyclone 16 and/or thickener 18 and concentrated by an evaporator. The overflow 32 from cyclone 16 and/or thickener 18 goes to metal recovery 24 and the residue or underflow 31 is recycled to the high pressure leach 6 or discarded if low in Ni and Co.

In one embodiment the neutralized low pressure leach slurry 30 is separated in cyclone 16 with the +200 mesh underflow 29 being filtered 20. The filtrate 21 joins the pregnant liquor 32 stream going to metal recovery either before or after thickening and the filter cake 303 is processed for chromite recovery. In this embodiment any nickel or cobalt present in the coarser fines (+200 mesh) 29 from the neutralized low pressure leachate 30 is rejected through the filter cake 303 and chromite recovery. In another embodiment, depicted in FIG. 2, such values may be totally or at least partially recovered by contact with excess acid in leach liquor 113, from the high pressure leach 6, within atmospheric leach 40.

Referring to FIG. 2, a process is presented in which the +200 mesh fraction of the LPL slurry 28 is recycled to a low temperature atmospheric leach 40. The high magnesium fraction 5 from the classifier 2 and the high pressure leach liquor 113 are also contacted in atmospheric leach 40. The atmospheric leachate 41 is separated, typically by cyclone 22, with the +200 mesh underflow 41B going to chromite recovery and the −200 mesh overflow 41A proceeding to the low pressure leach 12. The −200 mesh overflow 41A contains Ni- and Co-rich fines liberated during leaching. The −325 overflow 14 in FIGS. 1 and 2, is separated and optionally thickened, and then passes to the HPL 6, while the +325 fraction or underflow 15 from cyclone 4, goes to low pressure leach 12.

In an embodiment not depicted in the Figures, Mg and S are recovered after purification and Ni-Co recovery by crystalizing magnesium sulfate ($MgSO_4$), which is then calcined to MgO and $SO_2$. Some MgO may be recycled to the process for neutralization purposes, and the balance sold. The $SO_2$ may be converted to sulfuric acid for recycle to high pressure leach.

Prior art processes which dump spent leach liquor to an ocean do not recover Mg or S values, and pollute the aquatic environment with Fe, Al and other impurities. Prior art processes which include recovery of Mg and S values do not teach the removal of trivalent ions by the novel process of this invention. As a result, they produce leachates which are high in Fe and Al, and are costly and difficult to process as has been described hereinbefore.

As described hereinbefore the laterite ore useful for purposes of the present invention is first separated into at least two, preferably three or more fractions of relatively higher and lower magnesium content. During typical ore preparation, classification into appropriately sized fractions is effected, e.g. first by wet screening on the vibrating grizzly. Typically 95% or more of most metals reports to the minus 3-inch fraction. Only magnesium, a major acid consumer, is rejected in any quantity.

The minus three inch mesh or other sized initial fraction is further divided, typically into plus and minus one inch fractions, and then the minus one inch fraction is further separated into plus and minus ¼ inch fractions by wet screening on a vibrating screen.

The minus ¼ inch fraction is further separated, typically in a spiral classifier. When waterflow in the spiral classifier is adjusted to wash out the fines (approximately minus 270 mesh) the fines contained an average of about 85 percent of the nickel and 89 percent of the cobalt and amount to about 74 percent by weight of the minus 3 inch feed.

As will be known and understood by those skilled in the art the purpose of classifying the ore by size is in the distribution of important metals in the various ore fractions and that distribution is in large part dependent upon the specific ore. In general, however, by initially rejecting about 10 weight percent of the initial ore, some of the metal values are lost. However, this is compensated for by the fact that a significantly larger portion of the magnesium, the main acid consumer, is also rejected. In a preferred embodiment, +¼ inch fractions are rejected despite the fact that about 10 percent each of the initial cobalt and nickel may be contained therein because of the high proportion of acid-consuming magnesium. Of note is that nickel and cobalt values tend to concentrate in the fines and the magnesium in the coarse ore fractions. Depending upon the mill product involved, cobalt also concentrates somewhat in the coarse or intermediate sizes.

In operation an advantageous separation of the laterite feed has been into at least a high magnesium, lower nickel fraction of from ¼ inch to about 65 mesh, most preferably between ¼ inch and 100 mesh and a lower magnesium, higher nickel fines fraction of finer than about 65 mesh, preferably about minus 100 mesh. The optimum size division of the fraction is in large part determined by the specific ore(s) being treated and by the process steps and parameters to which the fractions will be exposed.

As will also be known and understood by those skilled in the art these fractions could proceed respectively to the low pressure leach and high pressure leach according to the present invention. Alternatively, as depicted in the flowsheets of FIGS. 1 and 2, it has been found advantageous to further separate the high nickel, low magnesium fines fraction into two fractions, one higher in magnesium which reports directly to the low pressure leach along with the initial high magnesium cut and a lower magnesium fraction which reports to the high pressure leach. Typically, this second separation is at about 150 to about 400 mesh preferably from about 200 to about 325 mesh.

EXPERIMENTAL

A series of tests simulating the steps of the processes of the present invention as depicted in each of FIGS. 1 and 2 were performed. The ore tested was from Gasquet Mountain laterite deposits obtained from test sampling pits.

EXAMPLE I

A series of tests were performed to demonstrate that low pressure leaching of the present invention decreases acid and removes Al and Fe from solution as non-gelatinous precipitates. Ore was classified into +100 and −100 mesh and the −100 mesh further classified into +325 mesh and −325 mesh. The +100 mesh ore fraction and the +325 mesh ore fraction were mixed with an evaporate, i.e. a high pressure leachate.

The mixture of ore fractions and evaporate was then leached in a low pressure leach at 180° C. for 40 minutes and at 160° C,. for 20 minutes and at 300 lbs. total pressure. No gelatinous materials were observed and the leach residue settled and filtered rapidly. The residue and filtrate were analyzed and the results are provided in Table I. The bottom half of the table shows the percentage of the Ni, Co and Mg in the insoluble material reporting to the plus 200-mesh portion of the residue.

TABLE I

| Test No. | G solids per liter evaporate | Final Free Acid g $H_2SO_4$/l | Filtrate Fe g/l | Al g/l | Dissolved, % Ni | Co | Mg |
|---|---|---|---|---|---|---|---|
| Evaporate Test Nos. 1–3: 19 g/l Fe, 5.1 g/l Al, 19.7 g/l $H_2SO_4$ | | | | | | | |
| 1 | 400 | 7.2 | 1.8 | 1.9 | 28 | 62 | 39 |
| 2 | 482 | 5.4 | 1.6 | 1.3 | 22 | 60 | 38 |
| 3 | 597 | 1.2 | 0.9 | 0.4 | 12 | 53 | 31 |
| Evaporate Test No. 4: 8.4 g/l Fe, 1.9 g/l Al, 63 g/l $H_2SO_4$ | | | | | | | |
| 4 | 400 | 10.3 | 0.47 | 0.71 | — | — | — |
| Evaporate Test No. 5: 5.0 g/l Fe, 2.2 g/l Al, 60.3 g/l $H_2SO_4$ | | | | | | | |
| 5 | 480 | 2.34 | 0.26 | 0.80 | — | — | — |
| Evaporate Test No. 6: 15.3 g/l Fe, 4.9 g/l Al, 77.7 g/l $H_2SO_4$ | | | | | | | |
| 6 | 480 | 2.1 | 0.16 | 0.32 | — | — | — |
| Evaporate Test No. 7: 2.9 g/l Fe, 0.1 g/l Al, 56.7 g/l $H_2SO_4$ | | | | | | | |
| 7 | 400 | 7.4 | 0.11 | 0.92 | — | — | — |

Distribution of Values in Residue
% of ¼-inch by 325-mesh Feed Content in −200 mesh

| Test No. | Nickel | Cobalt | Magnesium |
|---|---|---|---|
| 1 | 40 | 19 | 15 |
| 2 | 49 | 23 | 17 |
| 3 | 49 | 24 | 17 |
| 4 | Not Measured | | |
| 5 | Not Measured | | |
| 6 | Not Measured | | |
| 7 | Not Measured | | |

EXAMPLE II

Two series of four tests were performed similar to those of Example I but wherein the +100 mesh ore fraction was contacted with the HPL evaporate in an atmospheric leach prior to advancing to the low pressure leach. In the first series (Nos. 8–11) the atmospheric leach was at 80° C. for 8 hours, although most of the reaction occurred during the first 2 hours. The filtrate and residue from the atmospheric leach were analyzed and the data is provided in the top half of Table II. In the second series (Nos. 12–15) leaching was at 80° C. for 2 hours. The filtrate and residue were analyzed and the results provided in the bottom half of Table II. In both series there was no apparent reduction in the Fe and Al level in solution and no obvious Al or Fe precipitate was formed whereas free acid level in the solution decreased.

TABLE II

| Test No. | Solids % | Final Free Acid g $H_2SO_4$/l | Filtrate Fe g/l | Al g/l | Dissolved, % Ni | Co | Mg |
|---|---|---|---|---|---|---|---|
| Evaporate: 20 g/l Fe, 5.43 g/l Al, 36 g/l $H_2SO_4$ | | | | | | | |
| 8 | 5 | 14.7 | 21 | 5.4 | 44.1 | 56.4 | 46.0 |
| 9 | 10 | 10.3 | 23 | 5.5 | 35.8 | 50.6 | 42.5 |
| 10 | 15 | 11.7 | 22 | 5.6 | 43.2 | 55.3 | 39.4 |
| 11[1] | 10 | 6.2 | 20 | 5.5 | 41.3 | 57.4 | 41.6 |
| Evaporate: 22.7 g/l Fe, 4.99 g/l Al, 35 g/l $H_2SO_4$ | | | | | | | |
| 12[2] | 9.1 | 10.2 | 19 | 4.3 | 39 | 58 | 23 |

TABLE II-continued

| Test No. | Solids % | Final Free Acid g H$_2$SO$_4$/l | Filtrate Fe g/l | Al g/l | Dissolved, % Ni | Co | Mg |
|---|---|---|---|---|---|---|---|
| 13[2] | 7.7 | 11.8 | 20 | 4.9 | 33 | 53 | 24 |
| 14[2] | 6.3 | 10.8 | 22 | 5.1 | 37 | 55 | 26 |
| 15[2] | 4.8 | 12.0 | 20 | 4.8 | 38 | 57 | 30 |

[1]ground to pass 35-mesh
[2]ground to pass 20-mesh

The filtrate, i.e. leach liquor, from the atmospheric leach of Test Nos. 8-11 was composited and was low pressure leached at the same conditions as the LPL of Example I. The LPL filtrate and residue were analyzed and the results obtained are provided in Table III. As indicated, the free acid level was reduced further and the LPL resulted in removal of AL and Fe from solution as non-gelatinous precipitates which settled and filtered rapidly.

TABLE III

Atmospheric Leach Filtrate: 21 g/l Fe, 5.0 g/l Al, 15 g/l H$_2$SO$_4$

| Test No. | g solids/liter filtrate | Final Free Acid g H$_2$SO$_4$/l | Filtrate Fe g/l | Al g/l | Dissolved, % Ni | Co | Mg |
|---|---|---|---|---|---|---|---|
| 16 | 538 | 0.3 | 1.4 | 0.23 | 4 | 57 | 35 |
| 17 | 484 | 1.0 | 0.8 | 0.46 | 15 | 57 | 37 |
| 18 | 430 | 1.4 | 1.7 | 0.73 | 24 | 65 | 40 |

EXAMPLE III

Low pressure leach residues from Test No. 3 of Example I and Test No. 18 from Example II were analyzed and demonstrate that nickel and cobalt tend to be upgraded in the fine fraction and magnesium tends to be upgraded in the coarse fraction of the LPL residue in the proceses of both FIG. 1 and FIG. 2. The analysis of the residues from Test No. 3 and Test No. 18 are provided in Tables IV and V, respectively.

Low pressure leaching with and without prior atmospheric leaching results in depletion of the Ni and Co values from the coarser fraction which fraction contains the bulk of the insoluble magnesium. As such only the Ni/Co enriched fines fraction, i.e. minus 200 mesh in the Examples, need be advanced to the high pressure leach (HPL) to obtain high Ni/Co recovery while advancing a minimum of magnesium of the HPL.

TABLE IV

Test No. 3 LPL Residue (w/o Atm Leach)

| | Nickel | | Cobalt | | Magnesium | |
|---|---|---|---|---|---|---|
| | Dist. % | % Ni | Dist. % | grams | % Co | % Mg | Dist. % |
| +20-mesh | 11.65 | 0.502 | 11.76 | 0.042 | 13.56 | 7.67 | 13.05 |
| 20 × 48 | 13.30 | 0.351 | 9.39 | 0.029 | 10.68 | 9.35 | 18.15 |
| 48 × 100 | 16.48 | 0.308 | 10.21 | 0.026 | 11.87 | 9.79 | 23.56 |
| 100 × 200 | 18.10 | 0.363 | 13.21 | 0.029 | 14.54 | 8.04 | 21.25 |
| −200 | 40.47 | 0.681 | 55.43 | 0.044 | 49.34 | 4.06 | 23.99 |
| Total | 59.53 | 0.497 | 100.00 | 0.036 | 100.00 | 6.85 | 100.00 |

The data of Table IV show, for example, that if the residue is split at 200-mesh, about 50-55% of the nickel and cobalt is recovered and about 76% of magnesium is rejected. The minus 200-mesh fraction is advanced to the high pressure leach where most of the nickel and cobalt are dissolved.

TABLE V

Test No. 18 LPL Residue (w/ Atm Leach)

| | Nickel | | Cobalt | | Magnesium | |
|---|---|---|---|---|---|---|
| | Dist. % | % Ni | Dist. % | % Co | Dist. % | % Mg | Dist. % |
| +65-mesh | 7.94 | 0.335 | 5.60 | 0.022 | 5.61 | 11.00 | 14.61 |
| 65 × 150 | 22.68 | 0.334 | 15.95 | 0.023 | 16.76 | 8.38 | 31.79 |
| 150 × 270 | 24.23 | 0.391 | 19.96 | 0.027 | 21.03 | 6.96 | 28.22 |
| −270 | 45.15 | 0.615 | 58.49 | 0.039 | 56.59 | 3.36 | 25.38 |
| Total | 100.00 | 0.475 | 100.00 | 0.031 | 100.00 | 5.98 | 100.00 |

The data of Table V show, for example, that if the residue is split at 270-mesh, about 56-58% of the nickel and cobalt is recovered in the minus 270-mesh fraction and about 75% of the magnesium is rejected into the plus 270-mesh fraction.

EXAMPLE IV

Tests Nos. 12-15 of Example II demonstrate the advantages of the atmospheric leach of the high magnesium, coarse sands fraction with the high pressure leach liquor (as depicted in the process of FIG. 2) prior to the low pressure leach. In addition to partial neutralization of the free acid in the liquor, the nickel and cobalt present in the sands is recoverable.

The residue of these atmospheric leaches was analyzed and demonstrates that magnesium can be rejected in the coarse fraction, i.e. about plus 200 mesh, whereas nickel and cobalt concentrate in the −200 mesh fractions. The screen analysis data is provided in Table VI.

TABLE VI

Distribution of Values in Atmospheric Leached Residue

| Test No. | 12 | | 13 | |
|---|---|---|---|---|
| Screen Size | +200 | −200 | +200 | −200 |
| Weight, % | 76.4 | | 77.1 | |
| ANALYSIS | | | | |
| Nickel, % | 0.26 | 0.43 | 0.30 | 0.43 |
| Distr, % | 66.1 | | 68.2 | |
| Cobalt, % | 0.021 | 0.033 | 0.024 | 0.034 |
| Distr, % | 68.4 | | 66.7 | |
| Iron, % | 23.2 | 30.4 | 26.3 | 30.9 |
| Distr, % | 71.2 | | 74.1 | |
| Magnesium, % | 9.09 | 6.59 | 8.95 | 6.53 |
| Distr, % | 81.7 | | 82.1 | |
| Manganese, % | 0.15 | 0.16 | 0.16 | 0.17 |
| Distr, % | 75.0 | | 77.3 | |
| Chromium, % | 3.02 | 1.71 | 3.04 | 1.59 |
| Distr, % | 85.2 | | 86.4 | |
| Aluminum, % | 3.54 | 3.56 | 3.53 | 3.54 |
| Distr, % | 76.3 | | 77.0 | |
| Test No. | 14 | | 15 | |
| Screen Size | +200 | −200 | +200 | −200 |
| Weight, % | 77.9 | | 78.8 | |
| ANALYSIS | | | | |
| Nickel, % | 0.28 | 0.43 | 0.29 | 0.43 |
| Distr, % | 69.7 | | 70.8 | |
| Cobalt, % | 0.023 | 0.036 | 0.023 | 0.034 |
| Distr, % | 66.7 | | 72.5 | |
| Iron, % | 25.1 | 31.4 | 25.1 | 30.8 |
| Distr, % | 83.4 | | 84.3 | |
| Manganese, % | 0.16 | 0.18 | 0.16 | 0.17 |
| Distr, % | 76.5 | | 76.9 | |
| Chromium, % | 2.97 | 1.57 | 2.80 | 1.65 |
| Distr, % | 87.1 | | 86.3 | |
| Aluminum, % | 3.52 | 3.54 | 3.37 | 3.37 |
| Distr, % | 78.0 | | 78.9 | |

Assuming that only the minus 200-mesh fraction of the residue is advanced to the low pressure leach from the atmospheric leach, the combined recoveries for the atmospheric leach are shown below in Table VII.

TABLE VII

| Test No. | | 12 | 13 | 14 | 15 |
|---|---|---|---|---|---|
| Nickel | Dissolved, % | 39.2 | 33.0 | 36.7 | 37.6 |
| | In −200 mesh | 20.6 | 19.8 | 19.2 | 18.2 |
| | Total | 59.8 | 52.8 | 55.9 | 55.8 |
| Cobalt | Dissolved, % | 57.8 | 53.4 | 54.9 | 56.5 |
| | In −200 mesh | 13.3 | 15.5 | 15.0 | 12.6 |
| | Total | 71.1 | 68.9 | 69.9 | 69.1 |
| Iron | Dissolved, % | 14.6 | 6.1 | 10.6 | 12.5 |
| | In −200 mesh | 24.6 | 24.3 | 23.4 | 21.8 |
| | Total | 39.2 | 30.4 | 34.0 | 34.3 |
| Magnesium | Dissolved, % | 23.4 | 24.3 | 26.0 | 29.5 |
| | In −200 mesh | 14.0 | 13.5 | 12.3 | 11.1 |
| | Total | 37.4 | 37.8 | 38.3 | 40.6 |
| Manganese | Dissolved, % | 58.5 | 54.1 | 55.3 | 56.0 |
| | In −200 mesh | 10.4 | 10.4 | 10.5 | 10.2 |
| | Total | 68.9 | 64.5 | 65.8 | 66.2 |
| Chromium | Dissolved, % | 5.2 | 5.2 | 8.4 | 13.4 |
| | In −200 mesh | 14.1 | 12.6 | 11.9 | 11.9 |
| | Total | 19.3 | 17.8 | 20.3 | 25.3 |
| Aluminum | Dissolved, % | 11.9 | 12.1 | 13.8 | 18.8 |
| | In −200 mesh | 20.9 | 20.2 | 19.2 | 17.2 |
| | Total | 32.8 | 32.3 | 33.0 | 36.0 |

EXAMPLE V

For the three tests of Example I without an atmospheric leach, whose residues were screened and tested at 200 mech (Test Nos. 1–3), the combind recoveries, i.e. nickel and cobalt dissolved plus nickel and cobalt in the fine fraction of the low pressure leach residue, are shown in Table VIII.

TABLE VIII

Combined Recovery for LPL Tests

| Test No. | g Solids per Liter Lixiviant | Dissolved % | % in 200-mesh Residue | Combined Recovery, % |
|---|---|---|---|---|
| Nickel | | | | |
| 1 | 400 | 27.9 | 39.7 | 67.6 |
| 2 | 482 | 22.0 | 49.4 | 71.5 |
| 3 | 597 | 11.5 | 48.7 | 60.2 |
| Cobalt | | | | |
| 1 | 400 | 61.5 | 19.3 | 80.8 |
| 2 | 482 | 59.7 | 23.0 | 82.7 |
| 3 | 597 | 53.1 | 23.5 | 76.6 |
| Magnesium | | | | |
| 1 | 400 | 38.7 | 15.3 | 54.0 |
| 2 | 482 | 37.7 | 17.1 | 54.8 |
| 3 | 597 | 31.0 | 17.2 | 48.2 |

EXAMPLE VI

For tests of Table III of Example II with an atmospheric leach (Test Nos. 16–18), the combined recoveries for three tests are shown in Table IX.

TABLE IX

Combined Recovery of Ni, Co, and Mg for Low Pressure Leach Tests

| Test No. | g Solids per Liter Lixiviant | Dissolved % | % in 200-mesh Residue | Combined Recovery, % |
|---|---|---|---|---|
| Nickel | | | | |
| 16 | 538 | 4.05 | 65.2 | 69.3 |
| 17 | 484 | 15.0 | 57.8 | 72.8 |
| 18 | 430 | 24.1 | 51.6 | 75.7 |
| Cobalt | | | | |
| 16 | 538 | 57.2 | 28.3 | 85.4 |
| 17 | 484 | 57.4 | 28.1 | 85.5 |
| 18 | 430 | 64.6 | 23.4 | 88.0 |
| Magnesium | | | | |
| 16 | 538 | 35.4 | 22.6 | 58.0 |
| 17 | 484 | 37.0 | 22.1 | 59.1 |
| 18 | 430 | 39.6 | 21.1 | 60.7 |

EXAMPLE VII

A second series of low pressure leaches were performed and the residues analyzed for sulfate, Al and Fe to demonstrate removal of iron and aluminum as hematite and alunite, respectively. Conditions and residue analyses for the various tests are provided in Table VII. In each of the tests the absence of Fe and Al hydroxides was observable since no obviously gelatinous particles were formed and the residues settled and filtered rapidly.

TABLE IX

| Test No. | grams solids/ liter evaporate | Filtrate $H_2SO_4$ g/l | Filtrate Fe g/l | Filtrate Al g/l | Residue $SO_4$ % |
|---|---|---|---|---|---|
| Test Nos. 19–26 Evaporate: 15 g/l Fe 5.2 g/l Al 85 g/l $H_2SO_4$ | | | | | |
| 19 | 480 | 3.4 | 2.7 | 0.63 | 7.6 |
| 20 | 480 | 2.4 | 1.7 | 0.97 | 10.3 |
| 21 | 480 | 2.1 | 0.2 | 0.32 | 2.3 |
| 22 | 480 | 8.2 | 3.1 | 4.5 | 3.5 |
| 23 | 480 | 8.5 | 4.7 | 3.6 | 3.7 |
| 24 | 564 | 8.2 | 3.4 | 2.6 | 6.2 |
| 25 | 706 | 5.9 | 2.2 | 1.9 | 10.4 |
| 26 | 706 | 13.0 | 2.6 | — | 10.3 |
| Test No. 27 Evaporate: 5 g/l Fe, 2.2 g/l Al 60 g/l $H_2SO_4$ | | | | | |
| 27 | 450 | 2.3 | 0.7 | 0.80 | 3.6 |

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A method of recovering metal values from iron-, aluminum-, magnesium-, nickel- and cobalt-containing laterite ore comprising:
   (a) separating said ore into at least a first and second fraction, said second fraction containing more of said magnesium than said first fraction;
   (b) contacting said first fraction with sulfuric acid in a high pressure leach at elevated temperature and pressure sufficient to solubilize nickel and cobalt to form a solubilized nickel- and cobalt-containing high pressure leachate and a high pressure leach residue;
   (c) separating said high pressure leach residue from said high pressure leachate;
   (d) contacting at least a portion of said separated high pressure leachate, and at least a portion of said second fraction of step (a) in a low pressure leach at a pressure above atmospheric and below about 300 psig and at temperature conditions that precipitate said iron and said aluminum in crystalline form producing a low pressure leachate and a low pressure leach residue; and (e) recovering metal values from said Fe- and Al-depleted low pressure leachate and from at least a portion of said low pressure leach residue in a leaching step.

2. A method according to claim 1 further comprising separating from said first fraction a coarser third fraction, said third fraction containing more magnesium than said first fraction and less than said second fraction; and contacting at least a portion of said third fraction and at least a portion of said high pressure leachate in the low pressure leach of step (d).

3. A method according to claim 1 wherein at least a portion of said high pressure leachate of step (c) and at least a portion of said second fraction of step (a), are contacted in an atmospheric leach at atmospheric pressure and at a temperature below about 100° C. to form an atmospheric leach residue and an atmospheric leachate prior to contact in the low pressure leach of step (d).

4. A method according to claim 3 further comprising separating from said first fraction a coarser third fraction, said third fraction containing more magnesium than said first fraction and less than said second fraction, and contacting at least a portion of said third fraction and at least a portion of said atmospheric leachate in the low pressure leach of step (d).

5. A method according to claim 1 further comprising separating from said first fraction a coarser third fraction, said third fraction containing more magnesium than said first fraction and less than said second fraction, and contacting at least a portion of said third fraction in the low pressure leach of step (d).

6. A method according to claim 1 or claim 3, wherein at least a portion of said low pressure leachate is neutralized by the addition of a neutralization agent selected from the group consisting of alkali and alkaline earth oxides and alkali and alkaline earth hydroxides to form a neutralized low pressure leachate.

7. A method according to claim 1, or claim 2, or claim 3, or claim 4, wherein at least a portion of said low pressure leach residue is recycled to said high pressure leach.

8. A method according to claim 3 or claim 4, wherein at least a portion of said low pressure leach residue is recycled to said atmospheric leach.

9. A method according to claim 8 wherein a coarser fraction of said atmospheric leach residue is separated from said atmospheric leachate and the remainder of said atmospheric leach residue, and further comprising filtering said coarser fraction into a filtrate and a filter cake from which chromite is recovered.

10. A method according to claim 9 wherein at least a portion of said filtrate is recycled to said atmospheric leach.

11. A method according to claim 7 wherein said contacting with sulfuric acid in step (b) at elevated temperature further comprises contacting said first fraction and said low pressure leach residue with sulfuric acid before heating to said elevated temperature.

12. A method according to claim 1 further comprising recycling at least a portion of said low pressure leach residue to the high pressure leach of step (b).

13. A method according to claim 12 wherein at least a portion of said; high pressure leachate of step (b), at least a portion of said second fraction of step (a) and at least a portion of the said low pressure leach residue of step (d) are contacted in an atmospheric leach at atmospheric pressure and at a temperature below about 100° C. to form an atmospheric leachate prior to contact in the low pressure leach of step (d).

14. A method according to claim 1, or claim 2, or claim 3, or claim 4, or claim 5, further comprising recovering $MgSO_4$ from at least a portion of said low pressure leachate.

15. A method according to claim 14 further comprising calcining said $MgSO_4$ to produce $MgO$ and $SO_2$.

16. A method according to claim 15 further comprising recycling said $MgO$ to neutralize said low pressure leachate.

17. A method according to claim 15 further comprising producing $H_2SO_4$ from said $SO_2$, and recycling said $H_2SO_4$ to said high pressure leach.

18. A method of enhancing recovery of nickel and cobalt from aluminum-, iron-, nickel-, cobalt- and magnesium-containing laterite ore comprising:

(a) sulfuric acid leaching a low magnesium fraction of said ore at high pressure and temperature to solubilize said nickel, cobalt and iron and aluminum into a first acid leach liquor, and subsequently (b) contacting said leach liquor at a low pressure above atmospheric in the presence of at least one high magnesium fraction of said ore at a temperature whereby at least a portion of the acid is neutralized, said iron is precipitated as hematite and said aluminum is precipitated as alunite.

19. A method according to claim 18 wherein said contacting in step (b) is at a temperature of about 140° C. to 180° C. for about 1 hour to precipitate said iron, and then at a temperature of about 180° C. to 200° C. for about 1 hour to precipitate said aluminum.

20. A method according to claim 18 wherein said contacting in step (b) is performed at a temperature of about 180° C. to 200° C. for about 1 hour to precipitate said aluminum, and then at a temperature of about 140° C. to 180° C. for about 1 hour to precipitate said iron.

21. A method according to claim 19 or claim 20, wherein said contacting in step (b) to precipitate said iron is carried out at about 160° C. for about 30 to 40 minutes, and wherein said contacting in step (b) to precipitate said aluminum is carried out at about 180° C. for about 20 to 30 minutes.

* * * * *